United States Patent
Lee et al.

(10) Patent No.: US 10,132,666 B2
(45) Date of Patent: Nov. 20, 2018

(54) APPARATUS FOR MEASURING INTERIOR TEMPERATURE OF VEHICLE USING 3D THERMAL IMAGE

(71) Applicant: Halla Visteon Climate Control Corp., Daejeon (KR)

(72) Inventors: Jeong Hoon Lee, Daejeon (KR); Yeong Kil Kim, Daejeon (KR); Seung Cheol Song, Daejeon (KR); Chang Hyun Baek, Daejeon (KR); Young Min Kim, Daejeon (KR)

(73) Assignee: HANON SYSTEMS, Daejeon-si (KR)

( * ) Notice: Subject to any disclaimer, the term of this patent is extended or adjusted under 35 U.S.C. 154(b) by 248 days.

(21) Appl. No.: 14/391,738

(22) PCT Filed: Jun. 26, 2013

(86) PCT No.: PCT/KR2013/005646
§ 371 (c)(1),
(2) Date: Oct. 10, 2014

(87) PCT Pub. No.: WO2014/003433
PCT Pub. Date: Jan. 3, 2014

(65) Prior Publication Data
US 2015/0103141 A1    Apr. 16, 2015

(30) Foreign Application Priority Data

Jun. 26, 2012  (KR) .......... 10-2012-0068619
Jun. 26, 2012  (KR) .......... 10-2012-0068620
Jun. 26, 2013  (KR) .......... 10-2013-0073438

(51) Int. Cl.
*H04N 13/00*   (2018.01)
*G01F 1/68*    (2006.01)
(Continued)

(52) U.S. Cl.
CPC .............. *G01F 1/68* (2013.01); *G01J 5/0025* (2013.01); *G01J 5/041* (2013.01); *G01J 5/089* (2013.01);
(Continued)

(58) Field of Classification Search
None
See application file for complete search history.

(56) References Cited

U.S. PATENT DOCUMENTS 6,021,956 A  *  2/2000  Haraguchi ......... B60H 1/00742
                                                        236/49.3
2005/0231339 A1*  10/2005  Kudo ....................... B60R 1/00
                                                        340/435

(Continued)

FOREIGN PATENT DOCUMENTS

CN        1182249 A     5/1998
JP     2005140571 A     6/2005
(Continued)

*Primary Examiner* — Kate H Luo
(74) *Attorney, Agent, or Firm* — Shumaker, Loop & Kendrick, LLP; James D. Miller (57) ABSTRACT

An apparatus for measuring interior temperature of a vehicle using a 3D thermal image may include: a pair of stereo infrared (IR) sensors arranged at the front of the vehicle interior so as to be spaced from each other, and configured to measure 2D thermal images for the vehicle interior including a passenger; a calculator configured to convert the 2D thermal images measured through the pair of stereo IR sensors into a 3D thermal image; and a controller configured to calibrate the 3D thermal image information acquired through the calculator, according to variables having an influence on the temperature of the vehicle interior.

7 Claims, 11 Drawing Sheets

(51) Int. Cl.
*G01J 5/04* (2006.01)
*G01J 5/08* (2006.01)
*G01J 5/00* (2006.01)
*H04N 13/239* (2018.01)
*H04N 5/33* (2006.01)
*H04N 13/271* (2018.01)

(52) U.S. Cl.
CPC .... *H04N 13/239* (2018.05); *G01J 2005/0077* (2013.01); *H04N 5/33* (2013.01); *H04N 13/271* (2018.05)

(56) References Cited

U.S. PATENT DOCUMENTS

| | | | | |
|---|---|---|---|---|
| 2007/0003162 | A1* | 1/2007 | Miyoshi | G06T 15/20 382/276 |
| 2009/0273675 | A1* | 11/2009 | Jonsson | H04N 5/33 348/164 |
| 2010/0100275 | A1* | 4/2010 | Mian | G01M 17/013 701/31.4 |
| 2010/0189313 | A1* | 7/2010 | Prokoski | A61B 5/0064 382/118 |
| 2010/0224772 | A1 | 9/2010 | Lemieux et al. | |
| 2011/0118608 | A1* | 5/2011 | Lindner | A61B 5/015 600/474 |

FOREIGN PATENT DOCUMENTS

| | | |
|---|---|---|
| JP | 2006234383 A | 9/2006 |
| JP | 2006250733 A | 9/2006 |
| JP | 2007176203 A | 7/2007 |
| JP | 2008001220 A | 1/2008 |
| KR | 1020100125596 A | 12/2010 |
| KR | 1020110034248 A | 4/2011 |

\* cited by examiner

APPARATUS FOR MEASURING INTERIOR TEMPERATURE OF VEHICLE USING 3D THERMAL IMAGE

CROSS-REFERENCE(S) TO RELATED APPLICATIONS

This application is a United States national phase application based on PCT/KR2013/005646 filed Jun. 26, 2013 which claims the benefit of Korean Patent Application No. 10-2012-0068619 filed Jun. 26, 2012, Korean Patent Application No. 10-2012-0068620 filed on Jun. 26, 2012, and Korean Patent Application No. 10-2013-0073438 filed on Jun. 26, 2013. The disclosures of the above applications are hereby incorporated herein by reference in their entirety.

FIELD OF THE INVENTION

Exemplary embodiments of the present invention relate to an apparatus for measuring interior temperature of a vehicle using an infrared sensor, and more particularly, to an apparatus for measuring the interior temperature of a vehicle including passengers in the form of a 3D thermal image, using a pair of left and right stereo infrared (IR) sensors which are disposed at the front of the vehicle interior so as to be separated from each other with a predetermined interval therebetween.

BACKGROUND OF THE INVENTION

In order to optimize air-conditioning in the interior space of a vehicle, the temperature of the interior space must be measured with precision.

Representative examples of a method which is widely used for measuring the interior temperature of a vehicle may include a non-contact temperature measurement method using an infrared sensor. According to the non-contact temperature measurement method, the temperature of a passenger's face may be measured in a non-contact manner through an infrared (IR) sensor installed in the vehicle interior. Then, air-conditioning in the vehicle interior may be controlled according to the measurement result.

Figure 1:
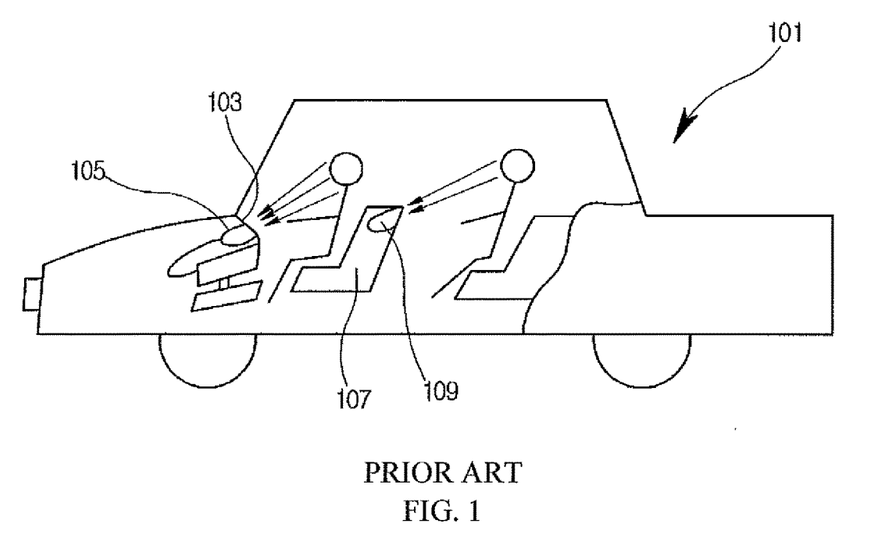
FIG. 1 is a schematic side view for explaining a conventional method for measuring interior temperature of a vehicle using an IR sensor.

FIG. 1 illustrates a conventional automotive air-conditioning system based on such a non-contact temperature measurement method using an IR sensor.

As indicated by reference numeral 101 in FIG. 1, the automotive air-conditioning system includes a front sensor 105 mounted on a dashboard 103 positioned at the front of the vehicle interior and a rear sensor 109 mounted on the rear surface of a front seatback 107. The front sensor 105 and the rear sensor 109 are mounted to be inclined backward and upward. As indicated by arrows in FIG. 1, the front and rear IR sensors 105 and 107 directly measure the temperatures of a driver's face and a passenger's face.

However, the arrangement of the front and rear sensors 105 and 107 may have a problem in that, when the temperature of the face of a passenger in a rear seat is measured, the rear sensor 107 may be covered by a seat cover of a front seat. Thus, the seat cover of the front seat must be removed or deformed to expose the rear sensor 107 to the outside.

Furthermore, the distance between the rear sensor 107 and the passenger in the rear seat is very short. Thus, in order to measure the temperature of the upper and lower bodies of the passenger as well as the temperature of the face of the passenger in the rear seat or measure the temperatures of passengers in the left and right rear seats through one sensor, an IR sensor with a wide-angle lens must be used or the number of sensors must be increased. Therefore, the sensor installation cost inevitably increases.

Figure 2:
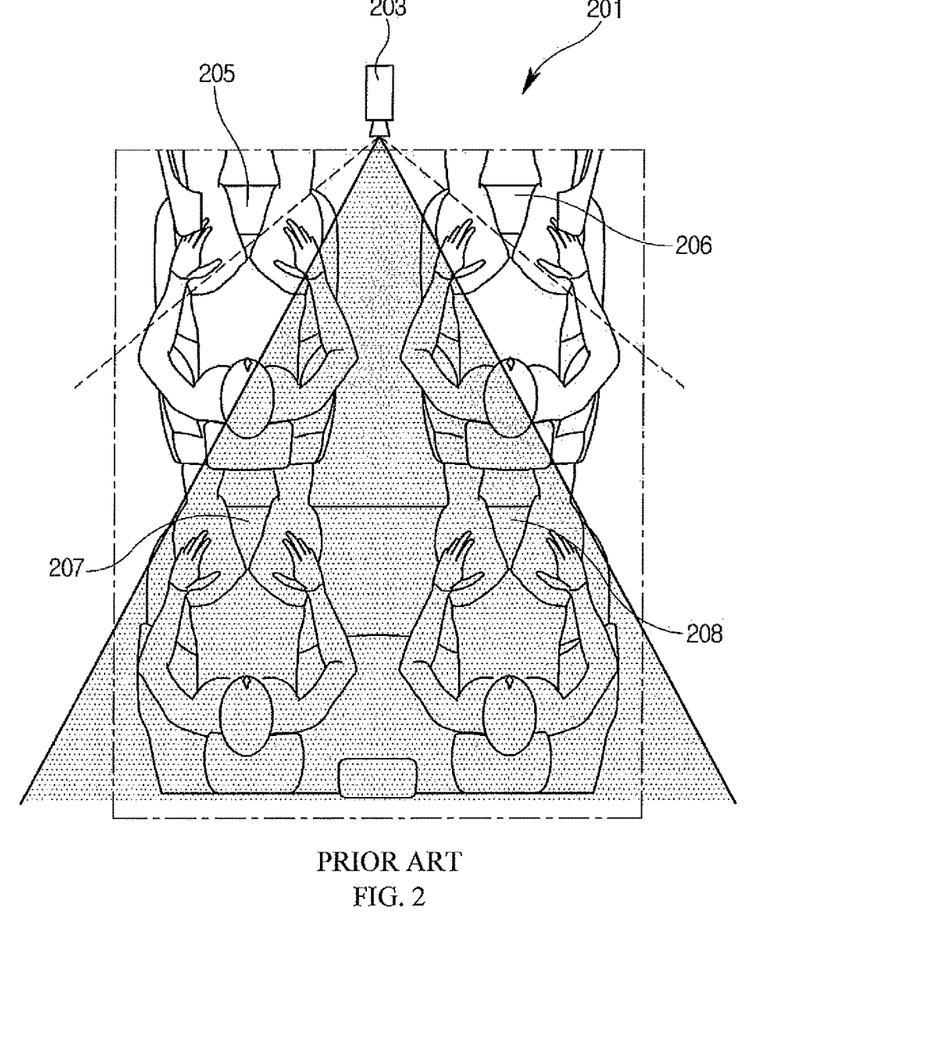
FIG. 2 is a partial plan view for explaining another conventional method for measuring interior temperature of a vehicle using an IR sensor.

In order to solve such a problem, another conventional automotive air-conditioning system represented by reference numeral 201 in FIG. 2 includes an IR sensor 203 which is disposed at a front top position of the interior of a vehicle, such as a room lamp unit, in order to measure the temperature of the entire body of a passenger in a rear seat. The one IR sensor 203 with a narrow-angle lens may be used to measure the temperatures of the entire bodies of passengers in left and right rear seats 207 and 208 and the temperature of a part of the faces of passengers in left and right front seats 205 and 206.

However, the IR sensor 203 disposed in such a manner has a narrow viewing angle as indicated by a solid line of FIG. 2. Thus, the IR sensor 203 cannot secure a wide viewing angle which may be covered through a sensor with a wide-angle lens, as indicated by a dotted line of FIG. 2. Therefore, in order to measure the temperatures of the passengers in the left and right front seats 205 and 206 as well as the left and right rear seats, an expensive sensor with a wide-angle lens must be employed, and the number of sensors used for the system must be increased. As a result, the manufacturing cost including the installation cost inevitably increases.

SUMMARY OF THE INVENTION

The present invention has been made in view of the above problems, and it is an object of the present invention to provide an apparatus for measuring interior temperature of a vehicle using an infrared sensor, which includes a pair of stereo IR sensors arranged in the vehicle interior with a predetermined interval provided therebetween, converts 2D thermal images measured for the vehicle interior through the respective IR sensors into a 3D thermal image, and precisely measure the temperature distribution of the vehicle interior, thereby improving the precision of the vehicle interior temperature measurement for air-conditioning.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, an apparatus for measuring interior temperature of a vehicle using a 3D thermal image may include: a pair of stereo IR sensors arranged at the front of the vehicle interior so as to be spaced from each other, and configured to measure 2D thermal images for the vehicle interior including a passenger; a calculator configured to convert the 2D thermal images measured through the pair of stereo IR sensors into a 3D thermal image; and a controller configured to calibrate the 3D thermal image information acquired through the calculator, according to variables having an influence on the temperature of the vehicle interior.

Each of the stereo IR sensors may be disposed to measure the temperatures of any one of front seats and two rear seats, among vehicle seats.

The stereo IR sensors may be disposed adjacent to the rear of a room mirror of the vehicle.

IR lenses of the stereo IR sensors may include a narrow-angle lens.

The IR lenses of the stereo IR sensors may have an angle of view ranging from 55° to 75°.

The stereo IR sensors may be disposed at the left and right ends of a room mirror of the vehicle, respectively.

Each of the stereo IR sensors may be disposed to measure the temperatures of any one of two rear seats and two front seats among vehicle seats.

The stereo IR sensors may be disposed at left and right A-pillars of the vehicle, respectively.

IR lenses of the stereo IR sensors may include a narrow-angle lens.

The IR lenses of the stereo IR sensors may have an angle of view ranging from 55° to 75°.

The stereo IR sensors may be disposed at the bottoms of left and right A-pillars of the vehicle, respectively.

The controller may calibrate the temperature information on the 3D thermal image acquired through the calculator through the following steps of: calibrating the stereo IR sensors disposed in the vehicle interior so as to correct distortion of the thermal images; measuring thermal images of the vehicle interior through the sensors calibrated at the step of calibrating the stereo IR sensors; comparing the thermal images, measured at the step of measuring the thermal images, and obtaining a coordinate disparity between corresponding points of the respective thermal images; and acquiring a 3D thermal image by imaging and mapping the coordinate disparity obtained at the step of comparing the thermal images.

The controller may calibrate the temperature information on the 3D thermal image acquired through the calculator through an additional step of removing an afterimage, vibration, and noise from the thermal images measured at the step of measuring the thermal images.

The controller may calibrate the temperature information on the 3D thermal image acquired through the calculator through an additional step of rectifying the thermal images measured at the step of measuring the thermal images, according calibration characteristic values of the stereo IR sensors which are acquired at the step of calibrating the stereo IR sensors.

When it is determined that a distance from the pair of stereo IR sensors for measuring thermal images for the vehicle interior to a specific coordinate of the vehicle interior is equal to or more than a predetermined distance, the controller may calibrate the temperature value measured at the specific coordinate into a higher temperature value.

The controller may repetitively compare the temperature values which are measured at a specific coordinate of the vehicle interior through the pair of stereo IR sensors, and determine that a failure occurred in the pair of stereo IR sensors, when a difference between the temperature values is equal to or more than a tolerance.

When temperature difference deviates from the tolerance, the controller may consider the specific coordinate as an error point, count the frequency at which the error point occurs, collectively offset the temperature values measured through the pair of stereo IR sensors in case where the occurrence frequency of the error point is equal to or more than 50%, and calibrate the temperature values of pixels of the thermal images, corresponding to the specific coordinate at which the temperature difference deviating from the tolerance occurred, in case where the occurrence frequency of the error point is less than 50%.

When the temperature difference deviates from the tolerance, the controller may sense an IR sensor in which an error occurred between the pair of stereo IR sensors, using a temperature value which is previously set for a separate member positioned in the vehicle interior, and calibrate the temperature of the thermal image measured through the IR sensor in which the error occurred.

The controller may calibrate the temperature value of the 3D thermal image by considering emissivity of the material of each member or each part of the human body, which is previously set according to the coordinate information of the vehicle interior, thereby calibrating the temperature information of the 3D thermal image acquired through the calculator.

When calibrating the temperature value of the 3D thermal image by considering the emissivity of the material of each member or each part of the human body, which is previously set according to the coordinate information of the vehicle interior, the controller may apply a radiant energy weight to each member or each part of the human body so as to calibrate the temperature value of the 3D thermal image, and the magnitude of the weight may be set in order of the human body, the ceiling of the vehicle, a door trim, clothes, the vehicle seats, and glass of the vehicle.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF EXEMPLARY EMBODIMENTS OF THE INVENTION

Hereafter, an apparatus for measuring interior temperature of a vehicle using a three-dimensional (3D) thermal image according to exemplary embodiments of the present invention will be described below in more detail with reference to the accompanying drawings.

Figure 3:
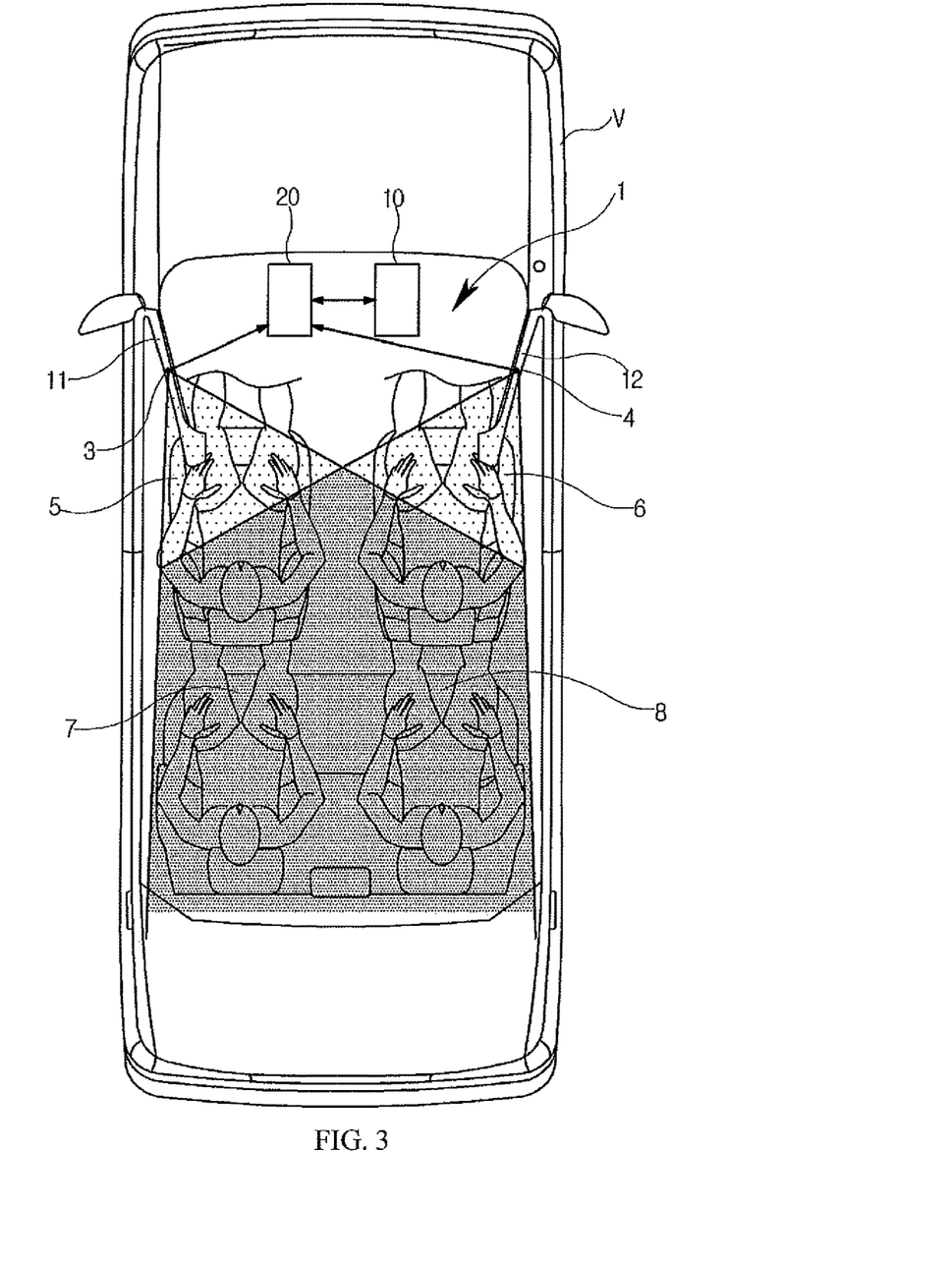
FIG. 3 is a plan view of a vehicle, illustrating an apparatus for measuring interior temperature of a vehicle using a 3D thermal image according to an embodiment of the present invention.

As indicated by reference numeral 1 in FIG. 3, an apparatus for measuring interior temperature of a vehicle according to an embodiment of the present invention includes a pair of left and right stereo infrared (IR) sensors 3 and 4, a calculator 10, and a controller 20.

Figure 4:
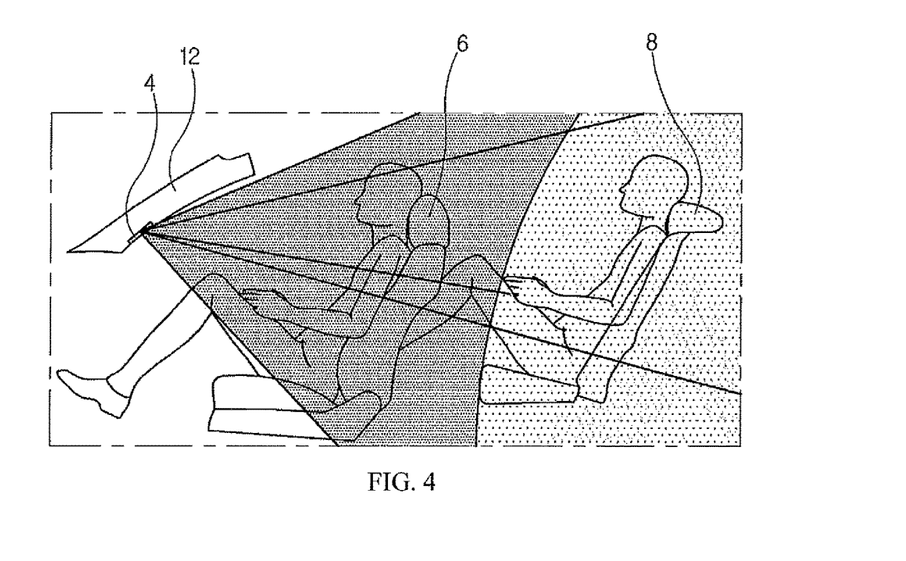
FIG. 4 is a side view of FIG. 3.
Figure 5:
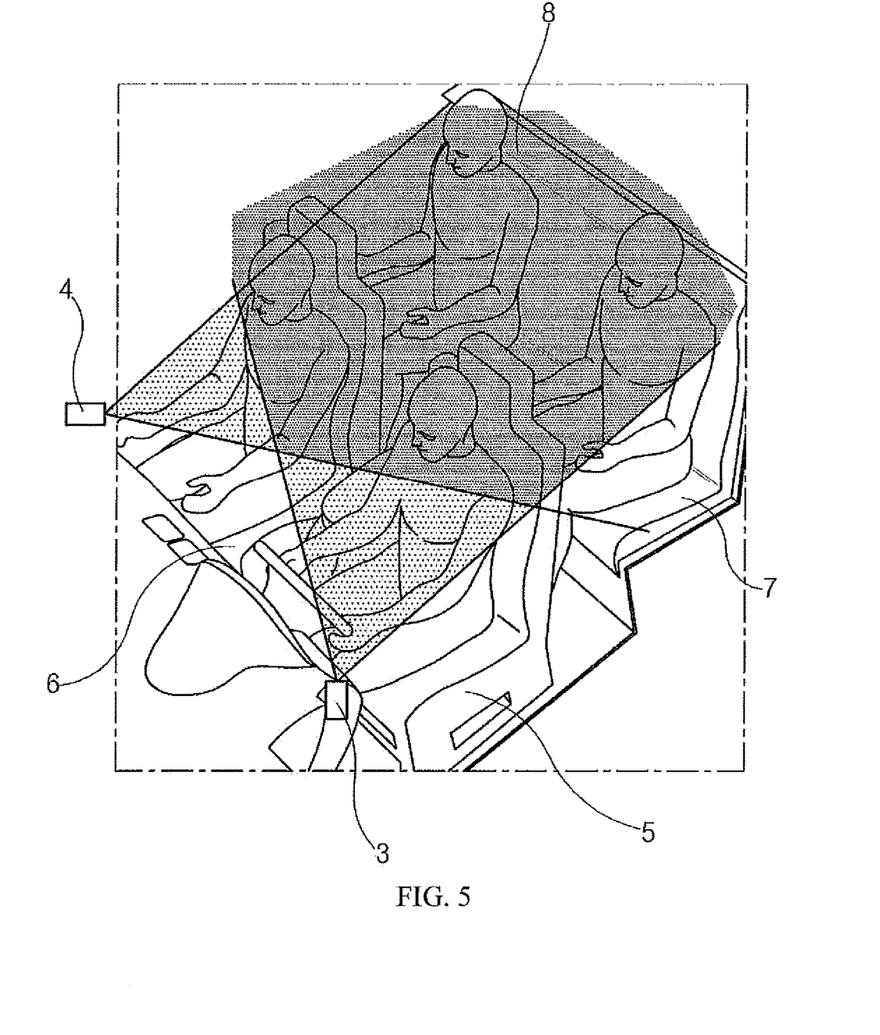
FIG. 5 is a perspective view of FIG. 3.

The stereo IR sensors 3 and 4 are arranged at the front of the vehicle interior so as to be separated from each other, and measure two-dimensional (2D) thermal images for forming a 3D thermal image for the vehicle interior. When the stereo IR sensors 3 and 4 are symmetrical vertically with respect to the central line of the vehicle, the stereo IR sensors 3 and 4 may be arranged at various positions of the front of the vehicle. As illustrated in FIGS. 3 to 5, the stereo IR sensors 3 and 4 may be disposed at left and right A-pillars 11 and 12 of the vehicle, respectively, so as to face the rear side. Thus, as a large number of passengers as possible may be included in a viewing angle.

Furthermore, when the stereo IR sensors 3 and 4 are positioned at the bottoms of the left and right A-pillars 11 and 12 inside the limited space of the vehicle, the viewing angles of the stereo IR sensors 3 and 4 may be widened. Thus, in order to widen the viewing angles of the stereo IR sensors 3 and 4 as much as possible, support brackets for the stereo IR sensors 3 and 4 may be disposed at the bottoms of the left and right A-pillars 11 and 12 of the vehicle.

The stereo IR sensors 3 and 4 measure a 2D thermal image for the vehicle interior including passengers. For this operation, the IR sensors may employ a narrow-angle sensor with a narrow-angle IR lens, as illustrated in FIGS. 3 and 4. In particular, the angle of view of the IR sensor may be set in the range of 55° to 75°. Desirably, the angle of view of the IR sensor may be set in the range of 60° to 70°. More desirably, the angle of view of the IR sensor may be set to 60°. That is because, although the measurement range of the IR sensors 3 and 4 based on the angle of view is two times narrower than that of an IR sensor using a wide-angle lens of which the angle of view ranges from 75° to 100°, thermal images measured through the IR sensors 3 and 4 are less distorted, and the unit price of the IR sensors 3 and 4 is two or more times smaller than that of the IR sensor using a wide-angle lens. On the other hand, when the angle of view decreases to 55° or less, the entire rear seats cannot be included in the measurement range, even though the IR sensors 3 and 4 are installed at the A-pillars 11 and 12 which are the farthest away from the rear seats in the vehicle interior.

At this time, the left IR sensor 3 is set to measure the temperature of a visible region ranging from the left corners of front and rear seats 5 and 7 disposed in the left side of the vehicle interior to the right top corner of a front right seat 4, that is, the front passenger seat. On the other hand, the right IR sensor 4 is set to measure the temperature of a visible region ranging from the right corners of front and rear seats 6 and 8 disposed in the right side of the vehicle interior to the left top corner of the front seat 5, that is, the driver's seat.

As illustrated in FIGS. 3 to 5, each of the IR sensors 3 and 4 has a measurement range formed in a cone shape of which the angle between two sides is set to about 60°. Thus, each of the IR sensors measures the temperature of the entire body of any one passenger between the left and right passengers in the rear seats 7 and 8 and the temperatures of the upper bodies of the left and right passengers in the front seats 5 and 6, that is, the driver's seat 5 and the front passenger's seat 6. That is, the left IR sensor 3 may measure the temperature of almost the entire body of the passenger in the right rear seat 8, but hardly measures the temperature of the passenger in the left rear seat 7 because the passenger is covered by the driver's seat 5. On the other hand, the right IR sensor 4 may measure the temperature of almost the entire body of the passenger in the left rear seat 7, but hardly measures the temperature of the passenger in the right rear seat 8 because the passenger is covered by the front passenger's seat 6.

Figure 6:
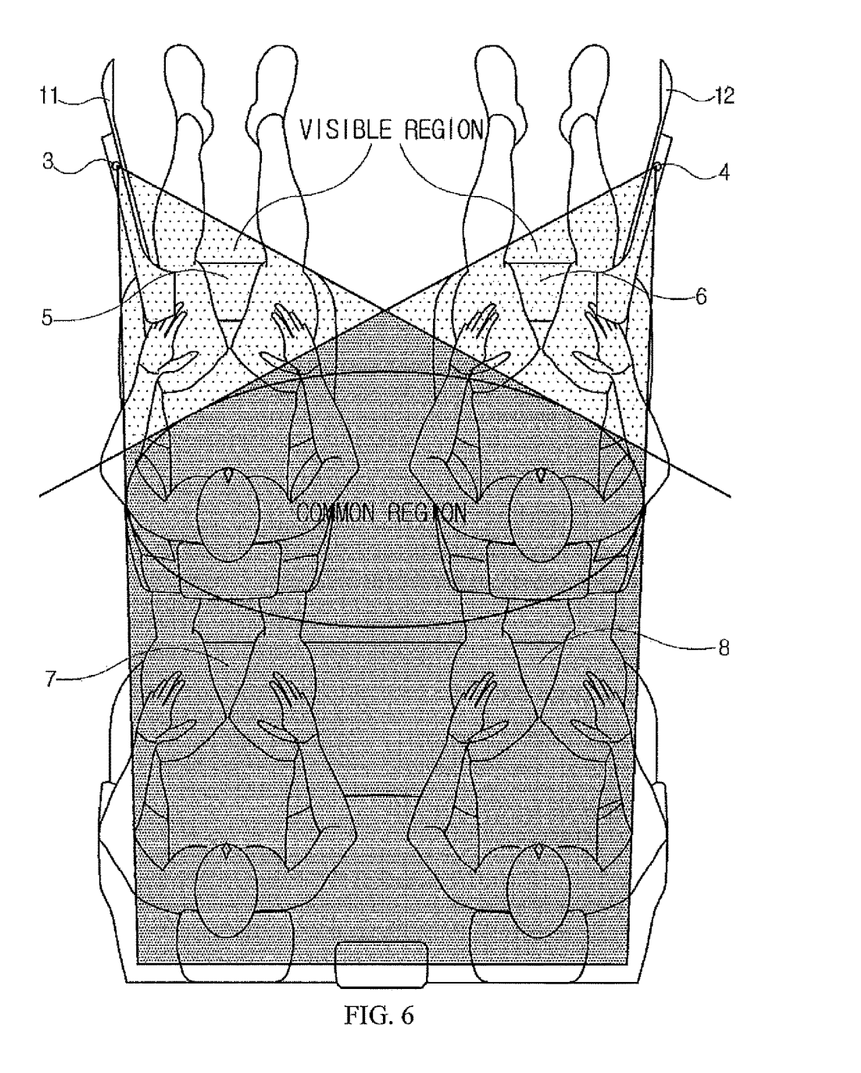
FIG. 6 is a plan view of FIG. 3.

Thus, as illustrated in FIG. 6, each of the IR sensors 3 and 4 measures the temperatures of the passengers in any one of the rear seats 7 and 8 and the front seats 5 and 6 among the vehicle seats or the temperatures of the vehicle seats, while the measurement regions of the IR sensors 3 and 4 cross each other. The IR sensors 3 and 4 form a common region for the front seats 5 and 6.

Figure 7:
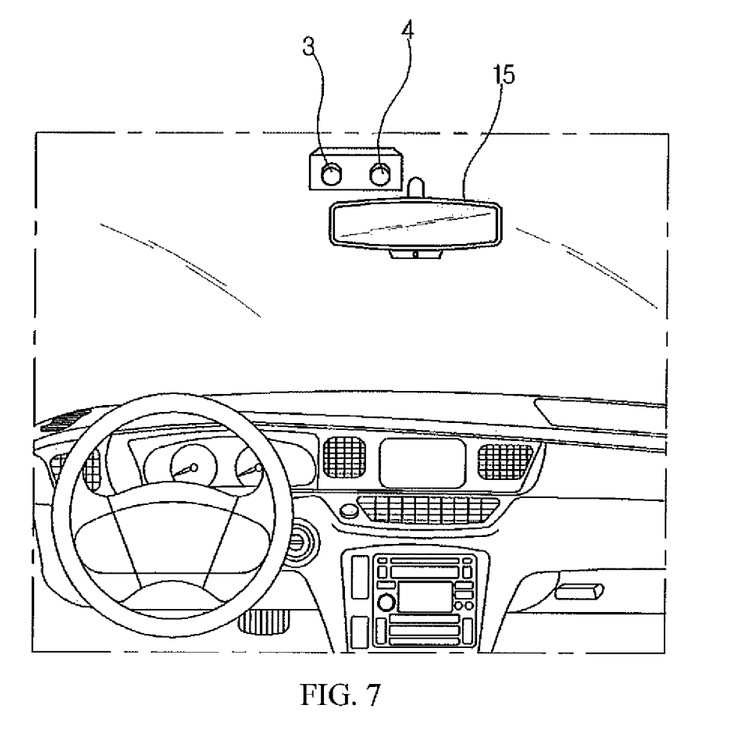
FIG. 7 is a diagram illustrating a part of the interior of a vehicle, in order to explain an apparatus for measuring interior temperature of a vehicle using a 3D thermal image, according to another embodiment of the present invention.
Figure 8:
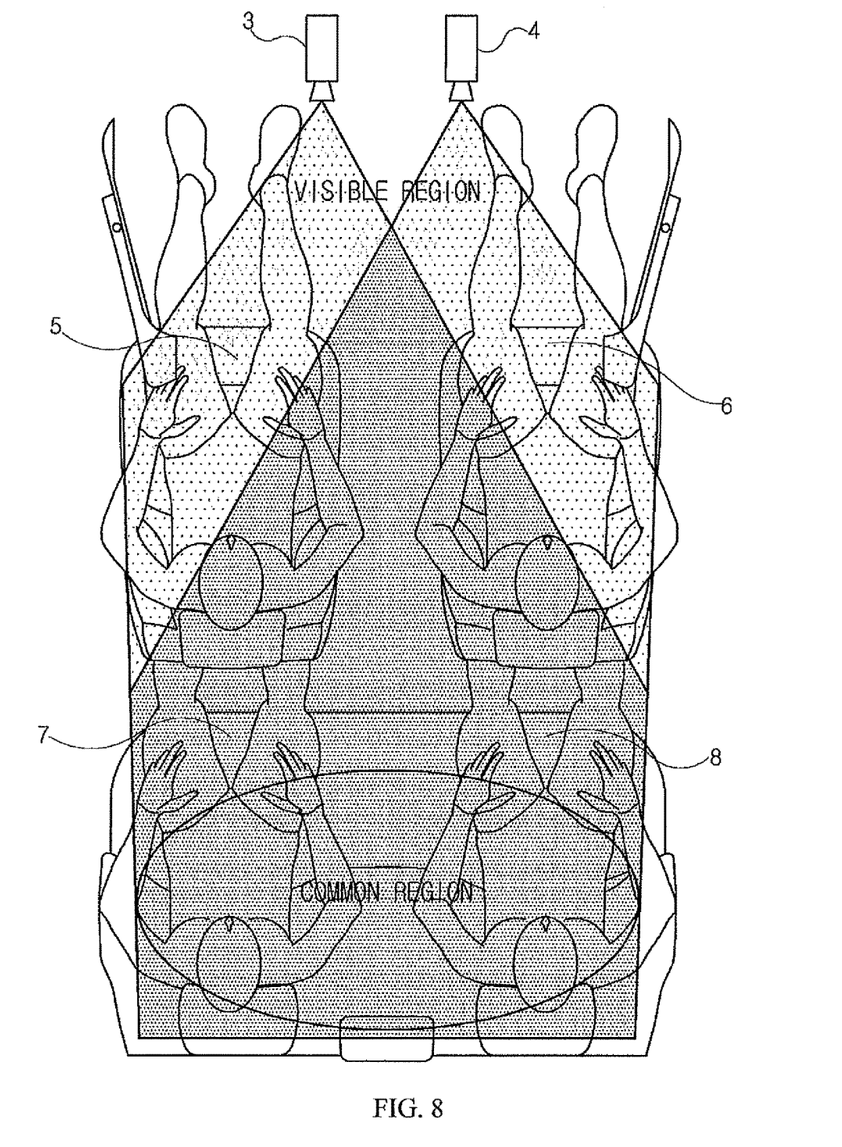
FIG. 8 is a plan view of the vehicle interior, illustrating the temperature measurement apparatus of FIG. 7.

FIGS. 7 and 8 illustrate another arrangement of the stereo IR sensors 3 and 4. As illustrated in FIGS. 7 and 8, the stereo IR sensors 3 and 4 are arranged in the center of the front of the vehicle. For example, the stereo IR sensors 3 and 4 may be arranged at the rear of a room mirror 15 of the vehicle so as to be positioned adjacent to the room mirror 15. Alternatively, although not illustrated, the stereo IR sensors 3 and 4 may be arranged in parallel to each other between a room lamp and a sun glass storage box, with a predetermined interval provided therebetween. Furthermore, the stereo IR sensors 3 and 4 may be disposed at the left and right ends of the room mirror 15 of the vehicle, in order to widen the left and right viewing angles as much as possible.

As such, when the stereo IR sensors 3 and 4 are arranged in the center of the front of the vehicle, the left IR sensor 3 measures the temperature of a visible region ranging from the left corner of the front left seat 5, that is, the driver's seat to the right corner of the rear right seat 8, and the right IR sensor 4 measures the temperature of a visible region ranging from the right corner of the front right seat 6, that is, the front passenger's seat to the left corner of the rear left seat 7.

Thus, the stereo IR sensors 3 and 4 arranged in the center of the front of the vehicle interior measure the temperatures of one front seat 5 or 6 and two rear seats 7 and 8 among the vehicle seats. As a result, as illustrated in FIG. 8, the stereo IR sensors 3 and 4 form a common region in the rear seats 7 and 8.

The calculator 10 serves to convert 2D thermal images measured through the stereo IR sensors 3 and 4 into a 3D thermal image. The calculator 10 calculates a 3D transformation matrix through 3D coordinates extracted by matching the two 2D thermal images measured through the IR sensors 3 and 4, and obtains a 3D thermal image from the 2D thermal images according to a stereo image matching method. The process will be described below in detail.

The controller 20 serves to control overall air-conditioning situations of the vehicle, like a general air-conditioning control unit. The controller 20 receives the interior and exterior temperatures of the vehicle and various variables, such as wind speed and humidity, which have an influence on the temperature of the vehicle interior, and calibrates the temperature information of the 3D thermal image obtained through the calculator 10.

When it is determined that a distance from the pair of stereo IR sensors 3 and 4 for measuring a thermal image of the vehicle interior to a specific coordinate of the vehicle interior is equal to or more than a predetermined distance, the controller 20 corrects a temperature value measured at the specific coordinate into a higher temperature value.

Figure 11:
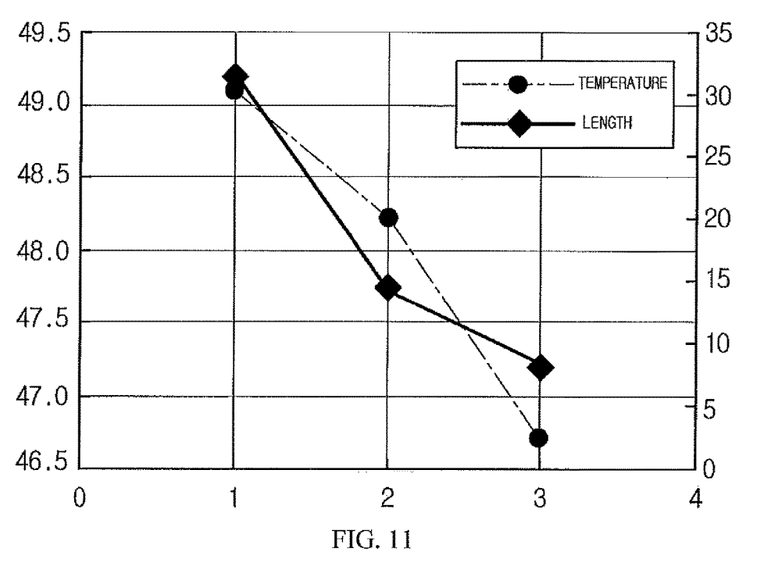
FIG. 11 is a graph illustrating temperature sensing characteristics based on distances from stereo IR sensors to the same member inside the vehicle.

The temperature calibration depending on the distance considers a temperature sensing characteristic based on distances from the stereo IR sensors 3 and 4 to the same member inside the vehicle, as illustrated in FIG. 11. The temperatures of thermal images for the same member inside the vehicle rapidly decrease with the increase in distance from the stereo IR sensors 3 and 4 to the same member, and the lengths of thermal images for the same member inside the vehicle gradually decrease with the increase in distance from the stereo IR sensors 3 and 4 to the same member. Thus, the temperature calibration is performed by reflecting the temperature and length characteristics of the thermal images. In FIG. 11, the horizontal axis indicates a distance (meter) from the stereo IR sensor 3 or 4 to the same member inside the vehicle, the left vertical axis indicates a temperature value (° C.) measured for the same member inside the vehicle, and the right vertical axis indicates the length (pixel) of a thermal image for the same member inside the vehicle.

The controller 20 repetitively compares temperature values which are measured at a specific coordinate of the vehicle interior through the pair of stereo IR sensors 3 and 4. When a difference between the temperature values is equal to or more than a tolerance Ttol, the controller 20 determines that a failure occurred in the pair of stereo IR sensors 3 and 4.

When the difference between the temperature values deviates from the tolerance Ttol, the controller 20 considers the specific coordinate of the vehicle interior as an error point, and counts the occurrence frequency of the error point. When the occurrence frequency of the error point is equal to or more than 50%, the controller 20 collectively offsets the temperature values measured through the pair of stereo IR sensors 3 and 4, and when the occurrence frequency of the error point is less than 50%, the controller 20 calibrates the temperature value of a pixel of the thermal image, corresponding to the specific coordinate at which the temperature difference deviating from the tolerance Ttol occurred.

When the temperature difference deviates from the tolerance Ttol, the controller 20 senses an IR sensor in which an error occurred, between the pair of stereo IR sensors 3 and 4, using a temperature value which is previously measured for a separate member positioned inside the vehicle. Then, the controller 20 calibrates the temperature value of the thermal image measured through the IR sensor in which the error occurred.

Furthermore, the controller 20 calibrates the temperature value of the 3D thermal image by considering a specific emissivity which is previously set for the material of each member or each part of the human body according to the coordinate information of the vehicle interior. That is, the controller 20 corrects the temperature information of the 3D thermal image calculated through the calculator 10.

Furthermore, when calibrating the temperature value of the 3D thermal image by considering a specific emissivity which is previously set for the material of each member or each part of the human body according to the coordinate information of the vehicle interior, the controller 20 may apply a radiant energy weight to the material of each member or each part of the human body, and the magnitude of the weight may be set in order of the human body, the ceiling of the vehicle, a door trim, clothes, the vehicle seats, and glass of the vehicle.

Now, the operation of the apparatus for measuring interior temperature of a vehicle using a 3D thermal image will be described in more detail.

Figure 9:
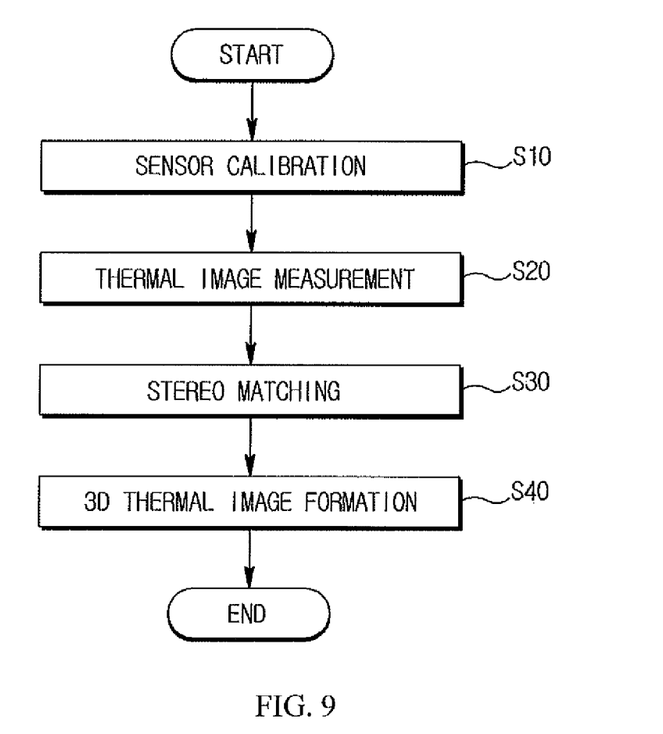
FIG. 9 is a block diagram illustrating a temperature measurement method using the apparatus for measuring interior temperature of a vehicle using a 3D thermal image according to the embodiment of the present invention.

Referring to FIG. 9, the temperature measurement apparatus according to the embodiment of the present invention forms a 3D thermal image for the vehicle interior through a sensor calibration step S10, a thermal image measurement step S20, a stereo matching step S30, and a 3D thermal image formation step S40. Furthermore, the temperature measurement apparatus forms a 3D thermal image of the vehicle interior through additional steps such as a temperature filtering step S50, a thermal image rectification step S60, a temperature compensation step S70, and a temperature re-compensation step S80.

Figure 10:
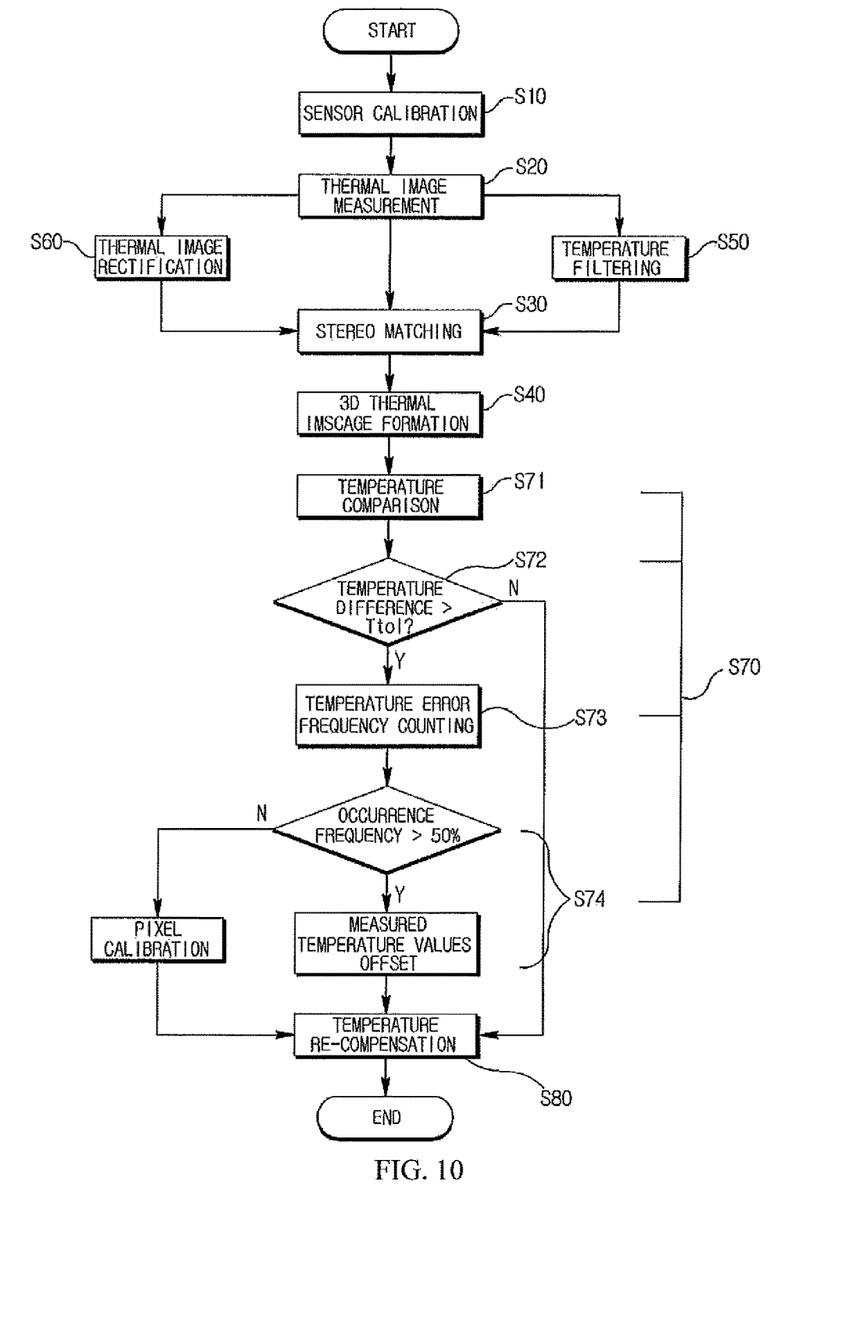
FIG. 10 is a flowchart of the temperature measurement method of FIG. 9.

Referring to FIGS. 9 and 10, the sensor calibration step S10 is to calibrate distortion of thermal images of the stereo IR sensors 3 and 4 disposed in the vehicle interior. In order to correct distortion of an optical image, a black and white checkered plate may be used. In this way, a calibration plate in which cold and warm regions are alternately arranged in a checked pattern is disposed at a predetermined distance from the IR sensors 3 and 4, and the temperature is measured while the posture of the calibration plate is set in various manners. Then, the measured thermal image information may be calibrated according to a general optical calibration method, in order to extract a calibration matrix.

Referring to FIGS. 9 and 10, the thermal image measurement step S20 is to measure thermal images of the vehicle interior through the stereo IR sensors 3 and 4 calibrated at the sensor calibration step S10. Each of the IR sensors 3 and 4 measures a thermal image for the same point on a virtual coordinate plane formed in the vehicle interior, and forms a 2D thermal image.

After the 2D thermal image is measured at the thermal image measurement step S20, the temperature filtering step S50 may be performed. Referring to FIGS. 9 and 10, the temperature filtering step S50 is to remove an afterimage, vibration, or noise which occurred in the thermal image measured at the thermal image measurement step S20, in order to improve the quality of the thermal image. For example, fixed pattern noise may be removed from the thermal image signals outputted from the IR sensors 3 and 4. As the noise is removed through various methods, the quality of the thermal images may be improved.

After the temperature filtering step S50 or the thermal image measurement step S20, the thermal image rectification step S60 may be performed before the stereo matching step S30. Referring to FIGS. 9 and 10, the thermal image rectification step S60 is to rectify the thermal images measured at the thermal image measurement step S20 according to the calibration characteristic value of the IR sensors 3 and 4, obtained at the sensor calibration step S10. The calibration characteristic value obtained at the sensor calibration step S10, that is, the calibration matrix may be used to rectify the calibrated thermal images.

The rectification for the thermal images is a process of satisfying an epipolar constraint of the thermal images measured through the left and right IR sensors 3 and 4. According to the epipolar constraint, when supposing that the optical axes of the stereo sensors 3 and 4 are parallel to each other, one point of the thermal image measured through one sensor 3 corresponds to one point of the thermal image measured through the other sensor 4. At this time, a line connecting the two corresponding points is referred to as an epipolar line.

Referring to FIGS. 9 and 10, the stereo matching step S30 is to compare the thermal images rectified at the thermal image rectification step S60 and calculate a coordinate disparity between corresponding points of the respective thermal images. Based on any one thermal image of the thermal images measured through the stereo sensors 3 and 4, the other thermal image is set to a target. Then, the positions of specific pixels at which a specific point on the virtual coordinate plane formed in the vehicle interior is projected onto the reference thermal image and the target thermal image may be obtained. Then, a difference between the acquired corresponding points within the thermal images may be calculated to finally acquire a coordinate disparity.

Referring to FIGS. 9 and 10, the 3D thermal image formation step S40 is to acquire a 3D thermal image by imaging and mapping the coordinate disparity between the thermal images, obtained at the stereo matching step S30. At this time, the 3D thermal image may be acquired from the respective thermal images on the basis of an image matching method among various methods for obtaining 3D image information from 2D images. For this operation, the disparity obtained at the stereo matching step S30 may be calculated for each pixel of the reference thermal image, and then stored as one image to form a disparity map. Then, the above-described process may be repeated to generate a plurality of disparity maps based on various changes in time. The generated disparity maps may be combined to finally acquire a 3D thermal image.

Referring to FIG. 10, the temperature compensation step S70 is to remove a deviation based on a difference in distance between the sensors 3 and 4 with respect to the 3D thermal image acquired at the 3D thermal image formation step S40. At this step, a temperature difference which occurs according to a difference in distance between the sensors 3 and 4 with respect to a specific coordinate of the vehicle interior, corresponding to a specific point of the 3D thermal image, may be removed.

For this operation, the temperature compensation step S70 may include a temperature comparison step S71, a temperature difference check step S72, a temperature error frequency counting step S73, and a temperature value calibration step S74, as illustrated in FIG. 10.

Referring to FIG. 10, the temperature comparison step S71 is to compare temperature values which are repetitively measured for a specific coordinate of the vehicle interior. At this step, the temperature values of various specific coordinates of the vehicle interior, corresponding to various specific points of the 3D thermal image acquired at the 3D thermal image formation step S40, may be repetitively measured through the IR sensors 3 and 4. Then, the measured temperature values may be compared to each other.

Referring to FIG. 10, the temperature difference check step S72 is to check whether a difference between the temperature values compared at the temperature comparison step S71 falls within a tolerance limit. At this step, whether the difference between the measured temperature values at each of the specific coordinates, compared at the temperature comparison step S71, deviates from the tolerance Ttol may be checked.

Referring to FIG. 10, the temperature error frequency counting step S73 is to count the frequency at which the temperature difference checked at the temperature difference check step S72 deviates from the tolerance Ttol. At this step, the coordinate at which the difference between the temperature values measured for the specific coordinate of the vehicle interior through the left and right sensors 3 and 4 deviates from the tolerance Ttol may be considered as an error point, and the frequency at which the error point occurs may be counted.

Referring to FIG. 10, the temperature value calibration step S74 is to offset the temperature values measured through the left and right stereo sensors 3 and 4, when the difference between the temperature values deviates from the tolerance Ttol. At this step, when the occurrence frequency of error points, counted at the temperature error frequency counting step S73, is equal to or more than 50%, for example, the temperature values measured through one sensor 3 or 4 causing the error may be collectively offset to compensate for the deviation between the temperature values measured through the left and right sensors 3 and 4. On the other hand, when the occurrence frequency of error points is less than 50%, it indicates that there are a small number of error points at which the difference between the temperature values measured through the left and right sensors 3 and 4 deviates from the tolerance Ttol. Thus, the pixel of the thermal image, corresponding to the coordinate, may be calibrated to compensate for the deviation between the measured temperature values.

The temperature re-compensation step S80 is to finally determine a 3D thermal image. Referring to FIG. 10, a deviation depending on the material of the temperature measurement target may be compensated, after the temperature difference caused by the difference in distance between the left and right sensors 3 and 4 is removed at the temperature compensation step S70. At this step, an emissivity set for the material of each member inside the vehicle, such as a seat, the ceiling, or glass, or each part of a passenger's body may be considered to compensate for the temperature value of the 3D thermal image from which the temperature difference based on the difference in distance between the left and right sensors 3 and 4 was removed at the temperature compensation step S70. The emissivity may be previously set and stored according to the coordinate information of the vehicle interior. At this time, an ideal body such as a black body has an emissivity of 1, the human body has an emissivity of 0.95, glass has an emissivity of 0.5, and the ceiling has an emissivity of 0.8, for example.

According to the embodiments of the present invention, the apparatus for measuring interior temperature of a vehicle using a 3D thermal image may three-dimensionally measure the temperature distribution of the vehicle interior through the pair of left and right stereo IR sensors disposed at the front of the vehicle interior. Thus, the measurement precision or accuracy of the temperature distribution may be improved.

Furthermore, since the temperature of one point on the virtual coordinate plane formed in the vehicle interior is measured through the two left and right IR sensors 3 and 4, the temperature calibration between the IR sensors 3 and 4 may be easily performed. Thus, the precision of the temperature measurement may be further improved.

Furthermore, the apparatus may calibrate an error of 3D thermal image information, which occurs due to a difference in distance between the respective IR sensors 3 and 4 with respect to a temperature measurement coordinate, and recalibrate the 3D thermal image information by considering the emissivity of the material of each member or each part of the human body at the temperature measurement point of the vehicle interior. Thus, the temperature measurement accuracy may be further improved.

While the present invention has been described with respect to the specific embodiments, it will be apparent to those skilled in the art that various changes and modifications may be made without departing from the spirit and scope of the invention as defined in the following claims.

What is claimed is:

1. A method for measuring interior temperature of a vehicle using a three-dimensional thermal image, comprising the steps of:

providing a pair of stereo infrared sensors spaced apart from each other and disposed in a front of an interior of the vehicle;

measuring two-dimensional thermal images of the interior of the vehicle with the pair of stereo infrared sensors;

providing a controller and a calculator in communication with the pair of stereo infrared sensors;

converting the two-dimensional thermal images measured by the pair of stereo infrared sensors into a three-dimensional thermal image by the calculator;

calibrating a temperature value of the three-dimensional thermal image converted by the calculator according to a plurality of temperature variables by the controller; and calibrating a first temperature value measured by the pair of stereo infrared sensors at a specific coordinate of the interior of the vehicle to a second temperature value by the controller if a distance from the pair of stereo infrared sensors to the specific coordinate of the interior of the vehicle is one of equal to and greater than a predetermined distance, and wherein the second temperature value is greater than the first temperature value.

2. The method according to claim 1, wherein the step of calibrating the temperature value of the three-dimensional thermal image converted by the calculator according to the plurality of temperature variables by the controller includes the steps of:

calibrating the pair of stereo infrared sensors to correct distortion;

measuring a thermal image formed in the interior of the vehicle through each of the pair of stereo infrared sensors to form a two-dimensional thermal image;

comparing the thermal image measured by a first one of the pair of stereo infrared sensors with the thermal image measured by a second one of the pair of stereo infrared sensors;

obtaining a coordinate disparity between corresponding points of the thermal image measured by the first one of the pair of stereo infrared sensors and the thermal image measured by the second one of the pair of stereo infrared sensors; and acquiring a three-dimensional thermal image by imaging and mapping the coordinate disparity.

3. The method according to claim 2, further comprising the steps of removing an afterimage, a vibration, and a noise from each of the thermal images measured by the pair of stereo infrared sensors, and rectifying each of the thermal images measured by the pair of stereo infrared sensors with a calibration characteristic value of each of the stereo infrared sensors.

4. A method for measuring interior temperature of a vehicle using a three-dimensional thermal image, comprising the steps of:

providing a pair of stereo infrared sensors spaced apart from each other and disposed in a front of an interior of the vehicle;

measuring two-dimensional thermal images of the interior of the vehicle with the pair of stereo infrared sensors;

providing a controller and a calculator in communication with the pair of stereo infrared sensors;

converting the two-dimensional thermal images measured by the pair of stereo infrared sensors into a three-dimensional thermal image by the calculator;

calibrating a temperature value of the three-dimensional thermal image converted by the calculator according to a plurality of temperature variables by the controller;

comparing a temperature value measured by a first one of the pair of stereo infrared sensors at a specific coordinate of the interior of the vehicle with a temperature value measured by a second one of the pair of stereo infrared sensors at the specific coordinate of the interior of the vehicle by the controller; and determining a failure in one of the pair of stereo infrared sensors if a difference between the temperature value measured by the first one of the pair of stereo infrared sensors and the temperature value measured by the second one of the pair of stereo infrared sensors is one of equal to and greater than a tolerance.

5. The method according to claim 4, further comprising the steps of:

considering the specific coordinate of the interior of the vehicle as an error point by the controller if the temperature difference between the temperature value measured by the first one of the pair of stereo infrared sensors and the temperature value measured by the second one of the pair of stereo infrared sensors deviates from the tolerance;

counting a frequency of an occurrence of the error point;

offsetting the temperature value measured by the one of the pair of infrared sensors determined the failure by the controller if the frequency of the occurrence of the error point is one of equal to and greater than 50%; and calibrating a pixel of the thermal images measured by the pair of stereo infrared sensors by the controller if the frequency of the occurrence of the error point is less than 50%, wherein the pixel corresponds to the error point.

6. The method according to claim 4, further comprising the step of calibrating the temperature value of the thermal image measured through the one of the pair of infrared sensors determined the failure by the controller by using a preset temperature value, the preset temperature value corresponds to a member positioned in the interior of the vehicle.

7. A method for measuring interior temperature of a vehicle using a three-dimensional thermal image, comprising the steps of:

providing a pair of stereo infrared sensors spaced apart from each other and disposed in a front of an interior of the vehicle;

measuring two-dimensional thermal images of the interior of the vehicle with the pair of stereo infrared sensors;

providing a controller and a calculator in communication with the pair of stereo infrared sensors;

converting the two-dimensional thermal images measured by the pair of stereo infrared sensors into a three-dimensional thermal image by the calculator; and calibrating a temperature value of the three-dimensional thermal image converted by the calculator according to a plurality of temperature variables by the controller, wherein the step of calibrating a temperature value of the three-dimensional thermal image converted by the calculator according to a plurality of temperature variables by the controller includes the steps of using a preset emissivity of a member positioned in the interior of the vehicle and applying a radiant energy weight to the member by the controller, and wherein a magnitude of the radiant energy weight corresponds to a magnitude of a weight of one of a human body, a ceiling of the vehicle, a door trim of the vehicle, a clothing of the member, a seat of the vehicle, and a glass of the vehicle.

* * * * *